United States Patent
Patel

(10) Patent No.: US 7,508,149 B2
(45) Date of Patent: Mar. 24, 2009

(54) OIL PUMP SYSTEMS AND METHODS FOR PREVENTING TORQUE OVERLOAD IN MOTORS OF OIL PUMP SYSTEMS

(75) Inventor: Nitinkumar R. Patel, Cypress, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 104 days.

(21) Appl. No.: 11/759,274

(22) Filed: Jun. 7, 2007

(65) Prior Publication Data

US 2008/0303477 A1    Dec. 11, 2008

(51) Int. Cl.
H02P 7/00 (2006.01)
H02P 21/14 (2006.01)

(52) U.S. Cl. ................. 318/432; 318/430; 318/802; 318/805

(58) Field of Classification Search ......... 318/430–434, 318/800–807
See application file for complete search history.

(56) References Cited

U.S. PATENT DOCUMENTS

| | | | | |
|---|---|---|---|---|
| 6,112,846 A | * | 9/2000 | Mukai et al. | 180/446 |
| 7,095,209 B2 | * | 8/2006 | Thunes et al. | 318/825 |
| 2006/0066275 A1 | * | 3/2006 | Thunes et al. | 318/432 |
| 2008/0116842 A1 | * | 5/2008 | Cheng et al. | 318/807 |

* cited by examiner

Primary Examiner—Paul Ip

(57) ABSTRACT

Methods and apparatus are provided for preventing a voltage overload condition of an alternating current ("AC") motor electrically coupled to an inverter. In an embodiment, the system includes an oil pump, a motor in communication with the oil pump, an inverter module in electrical communication with the motor, the inverter module configured to generate a speed command, and a controller module. The controller module is in communication with the inverter module and the motor and is configured to determine an error, based, in part, on an estimated torque value of the motor and a predetermined maximum available torque value, to convert the error into a first value, to limit the first value between a negative value and zero, and to add the first value to the speed command from the inverter to thereby generate a final speed command for the motor.

14 Claims, 3 Drawing Sheets

OIL PUMP SYSTEMS AND METHODS FOR PREVENTING TORQUE OVERLOAD IN MOTORS OF OIL PUMP SYSTEMS

TECHNICAL FIELD

The subject matter generally relates to oil pumps, and more particularly relates to oil pump systems and methods for preventing torque overload in motors of oil pump systems.

BACKGROUND

A vehicle transmission delivers mechanical power from an engine to the remainder of a drive system, such as fixed final drive gearing, axles and wheels. To operate efficiently, the vehicle transmission is typically lubricated with a lubricant, such as oil. The transmission may be coupled to a transmission auxiliary oil pump ("TAOP"), which pumps the lubricant from a source to the transmission.

The TAOP is powered by a motor, such as an alternating current ("AC") motor, which may be supplied with a current via a voltage source inverter. The particular magnitude of current provided to the motor depends on an amount of oil that is needed by the transmission, the viscosity of the oil, the specific operating temperature of the oil, or a desired oil flow rate. Typically, the motor is also electrically coupled to a DC bus, which provides a voltage to counter unwanted effects of a back electromagnetic flux ("EMF") that may be produced if the voltage source inverter provides a current magnitude that exceeds maximum torque limits of the AC motor.

Although the aforementioned TAOP generally operates adequately, it may be improved. For example, as mentioned above, the AC motor may be configured to operate up to certain maximum torque limits; however, in some cases, it may be desirable to maintain motor operation below the maximum torque limit and to prevent a torque overload on the motor. Furthermore, other desirable features and characteristics of the inventive subject matter will become apparent from the subsequent detailed description and the appended claims, taken in conjunction with the accompanying drawings and the foregoing technical field and background.

SUMMARY

A method is provided for preventing a torque overload condition of a motor electrically coupled to an inverter. In an embodiment, the method includes calculating an estimated torque value, based, in part on an estimated speed value of a rotor of the motor, and a dc link voltage value and a dc link current value from the inverter. The estimated torque value is compared with a maximum available torque value. An error is generated based on the comparison of the estimated torque value and the maximum available torque value. The error is converted to a first value. The first value is limited between a negative value and zero. The first value is added to a speed command from the inverter. A final speed command is generated from the inverter speed command.

An oil pump system is also provided. In an embodiment, the system includes an oil pump, a motor in communication with the oil pump, an inverter module in electrical communication with the motor, the inverter module configured to generate a speed command, and a controller module. The controller module is in communication with the inverter module and is configured to determine an error, based, in part, on an estimated torque value of the motor and a predetermined maximum available torque value, to convert the error into a first value, to limit the first value between a negative value and zero, and to add the first value to the speed command from the inverter to thereby generate a final speed command for the motor.

DESCRIPTION OF THE DRAWINGS

The subject matter will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the inventive subject matter or the application and uses of the subject matter. Furthermore, there is no intention to be bound by any expressed or implied theory presented in the preceding technical field, background, brief summary or the following detailed description.

Figure 1:
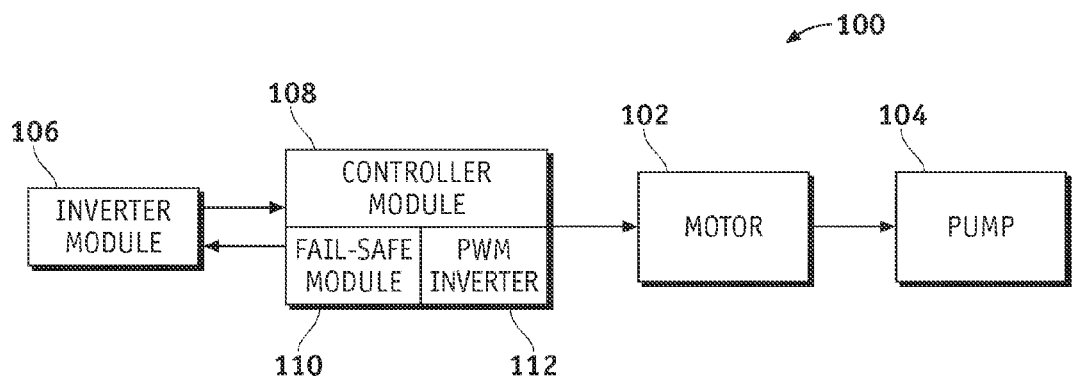
FIG. 1 is a block diagram of a transmission auxiliary oil pump system, in accordance with an embodiment.

Referring to FIG. 1, a block diagram of a transmission auxiliary oil pump system 100 is shown in accordance with an embodiment. The system 100 includes a motor 102, an oil pump 104, an inverter module 106, and a controller module 108. The motor 102 is configured to provide power for the operation of the oil pump 104. The motor 102 may be an alternating current ("AC") motor, a synchronous reluctance motors, an induction motor, an interior permanent magnet motor or any other suitable motor capable of supplying power to the oil pump 104. In an embodiment, the motor 102 is configured to operate up to a maximum speed to thereby produce a maximum torque. It will be appreciated that the speed at which the motor 102 operates is directly proportional to the power outputted therefrom. Thus, as the operational speed of the motor 102 increases, the magnitude of power outputted therefrom increases, and the rate at which oil is pumped through the oil pump 104 increases as well.

The inverter module 106 and the controller module 108 are configured to electrically communicate with each other and to control the amount of power outputted by the motor 102. It will be appreciated that one or more components of the inverter module 106 and the controller module 108 may be configured to communicate data, either electrically or wirelessly, and may be embodied in software or firmware, hardware, such as an application specific integrated circuit (ASIC), an electronic circuit, a processor (shared, dedicated or group) and memory that execute one or more software or firmware programs, a combinational logic circuit, and/or other suitable components or combinations thereof.

In an embodiment, the inverter module 106 is configured to generate an initial speed command. In this regard, the inverter module 106 obtains estimated speed and diagnostic data and desired oil pump flow rate data from the controller module 108. The inverter module 106 processes the data via, for example, a processor, and the initial speed command is generated and delivered back to the controller module 108.

Figure 2:
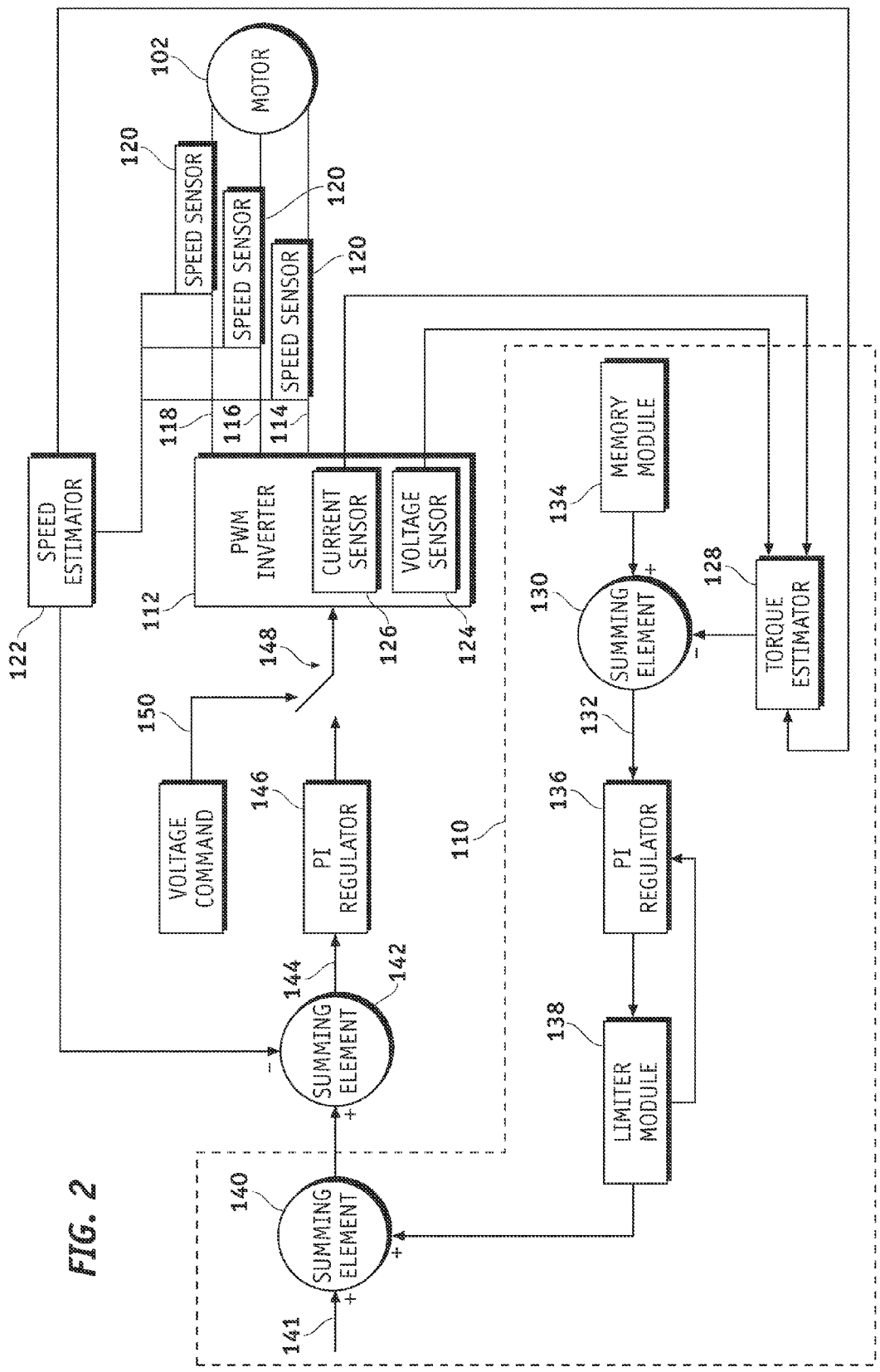
FIG. 2 is a block diagram illustrating a controller module for use with the transmission auxiliary oil pump system shown in FIG. 1, in accordance with an embodiment.

FIG. 2 is a block diagram illustrating the controller module 108 for use with the transmission auxiliary oil pump system 100, in accordance with an embodiment. The controller module 108 modifies the initial speed command, if the commanded speed exceeds the maximum speed of the motor 102 or does not alter the initial speed command if the commanded speed does not exceed the maximum speed of the motor 102, to prevent a torque overload condition in the motor 102. To do so, the controller module 108 includes a fail-safe module 110 that electrically communicates with the motor 102 and a pulse width modulation ("PWM") inverter 112. The fail-safe module 110 receives sensed values, such as voltage values, current values, and estimated speed values, and calculates an estimated torque value from the sensed values. The fail-safe module 110 then compares the estimated torque value against a predetermined maximum allowable torque value for the sensed values in order to generate an error. The generated error can then be used to produce a speed command for the inverter module 106 (shown in FIG. 1), which may be used to accelerate the motor 102 to a desired speed.

The sensed values may be obtained through connections 114, 116, 118 that couple the PWM inverter 112 to the motor 102. The connections 114, 116, 118 include a number of connection lines defined by the number of phases used in the motor 102. For example, a three-phase motor 102 may have three connection lines 114, 116, 118 as shown in FIG. 2. In an embodiment, one or more speed sensors 120 are coupled to the connection lines 114, 116, 118 to sense an estimated speed. The output of the speed sensors 120 are coupled to a speed estimator 122, which calculates from the estimated speed an estimated speed value at which the motor 102 is operating. The speed estimator 122 provides the estimated speed value to the fail-safe module 110. Voltage sensors 124 and current sensors 126 are coupled to the PWM inverter 112 to sense estimated dc link voltage values and dc link current values. The output of those sensors 124, 126 are also provided to the fail-safe module 110.

With continued reference to FIG. 2 and as mentioned above, the fail safe module 110 generates an error, based, in part, on the estimated torque value. In an embodiment, the fail safe module 110 includes a torque estimator 128, which receives a signal from the speed estimator 122 and estimated sensed values from the voltage and current sensors 124, 126. The torque estimator 128 calculates an estimated torque value from the sensed values and feeds the calculated estimated torque value to a first summation element 130. The first summation element 130 generates an error output 132 based, in part, on a comparison between the estimated torque value and a maximum available torque value. The maximum available torque value is also determined from the sensed values and from data stored in a memory module 134. For example, in an embodiment, the data is stored as a lookup table that includes an acceptable range of maximum available torque values and speed and voltage values associated with the maximum available torque values.

A first proportional integral (PI) regulator 136 receives the error output 132 from the first summation element 130 and converts the generated error to a reduction value. The reduction value is inputted into a limiter module 138, which limits the reduction value to a value between a negative value and zero, if the generated error indicates that the estimated torque value is greater than the maximum available torque value. In another embodiment, the limiter module 138 is configured to produce a signal to re-set the reduction value to zero, if the generated error indicates that the estimated torque value is less than the maximum available torque value.

The reduction value is inputted into a second summation element 140. The second summation element 140 is coupled to receive a speed command 141 from the inverter module 106 and configured to add the reduction value to the speed command to generate a final speed command. As a result, the final speed command is maintained below an acceptable speed associated with a maximum available torque.

The final speed command is then used to produce an initial voltage command. In an embodiment, the final speed command is inputted into a third summation element 142, which also receives the estimated speed value from the speed estimator 122. The summation element 142 compares the estimated speed value with the final speed command and generates an error output 144. The error output 144 is then inputted into a second PI regulator 146, which converts the error output 144 into the initial voltage command. The initial voltage command is then fed to the PWM inverter 112.

A switch 148 may be included between the second PI regulator 146 and the PWM inverter 112. The switch 148 may be configured to selectively move between an ON and an OFF position, depending on whether the system is in an alignment mode, an acceleration mode, or a speed control mode. An alignment mode, as used herein, may be defined as a mode in which a rotor (not shown) of the motor 102 is aligned to a particular position. An acceleration mode, as used herein, may be defined as accelerating the rotor to a speed at which the speed estimator 122 can detect zero crossings of sensed voltages, which may then be used to estimate the rotor speed. A speed control mode, as used herein, may be defined as using an estimated speed to control motor 102 speed. In an embodiment, the switch 148 moves to an OFF position, if a voltage command 150 is provided indicating an alignment or acceleration mode, and to an ON position if a voltage command 150 is provided indicating a speed control mode. In both OFF and ON positions, a final voltage command is processed and inputted to the PWM inverter 112.

To generate a suitable load from the motor 102, the final voltage command is modulated by the PWM inverter 112. As a result of the modulation, the PWM inverter 112 generates a three phase voltage that is then supplied to the motor 102.

Figure 3:
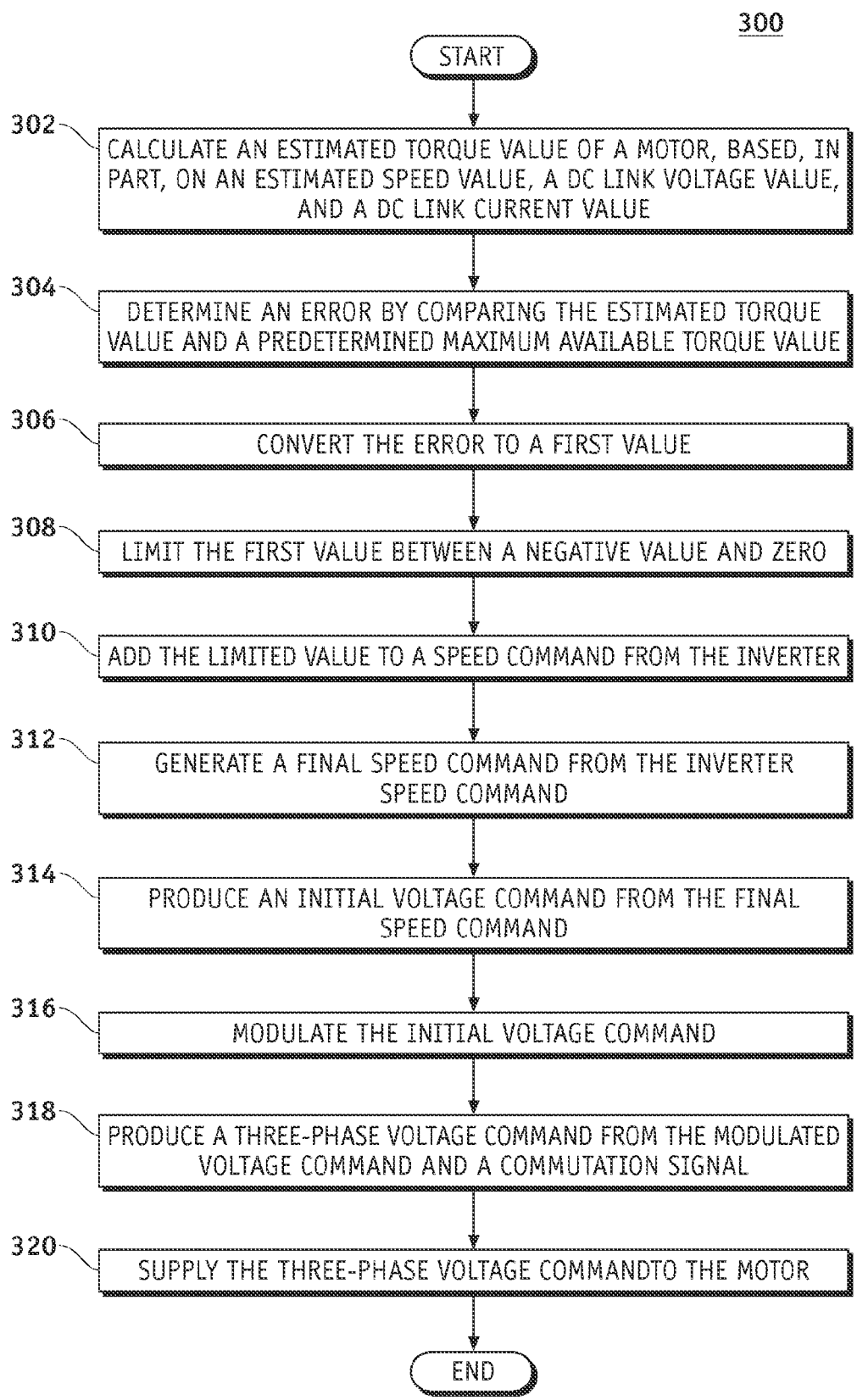
FIG. 3 is a flow diagram illustrating a method of preventing torque overload in a motor of the transmission auxiliary oil pump system of FIG. 1, in accordance with an embodiment.

With additional reference to FIG. 3, a flow diagram is provided illustrating a method 300 of preventing torque overload in the motor 102 of the transmission auxiliary oil pump system 100 where, as shown in FIG. 1, the motor 102 is electrically coupled to the inverter 106, in accordance with an embodiment. In an embodiment, an estimated torque value of the motor 102 is calculated, based, in part, on an estimated speed value, a dc link voltage value, and a dc link current value, step 302. The estimated torque may be calculated using the torque estimator 128, which obtains the estimated speed from the speed estimator 122, and the sensed DC link voltage and the sensed DC link current from the voltage sensor 124 and the current sensors 126, respectively.

Figure 4:
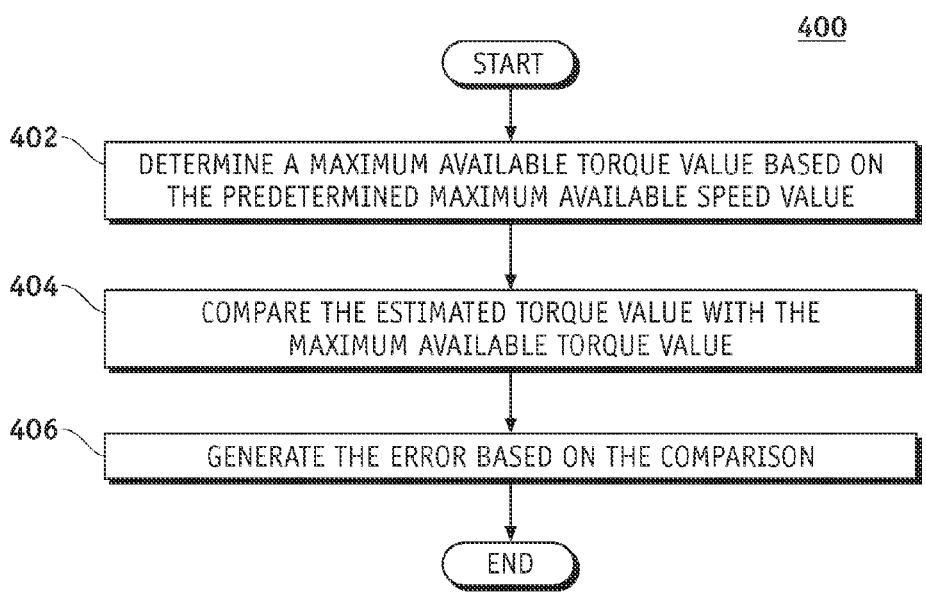
FIG. 4 is a flow diagram illustrating a step of the method in FIG. 3, in accordance with an embodiment.

An error is then determined by comparing the estimated torque value and a predetermined maximum available torque value, step 304. In an embodiment of step 304, as shown in a flow diagram depicted in FIG. 4, a maximum available torque value is determined based on sensed speed values and dc link voltage values, step 402. For example, the maximum available torque value may be generated from a predetermined table, where the predetermined table includes a range of torque values, a range of predetermined available speed values, and a range of predetermined available voltage values, the predetermined available speed values and the predetermined available voltage values each associated with a torque value of the range of torque values. The estimated torque value is then compared with the maximum available torque value, step 404, and the error is generated based on the comparison of the estimated torque value and the maximum available torque value, step 406.

Next, the error is converted to a first value, step 306. The first value is then limited between a negative value and zero, step 308. The first value is then added to a speed command from the inverter 106, step 310. A final speed command is generated from the inverter speed command, step 312.

In an embodiment, the method also includes the step of producing an initial voltage command from the final speed command, step 314. In another embodiment, the initial voltage command may be modulated using a pulse width modulator 112, step 316. In still another embodiment, a three-phase voltage command may be produced, based on the modulated voltage command and a commutation signal from the PWM inverter 112, step 318. The three-phase voltage command may then be supplied to the motor 102, step 320.

Advantageously, because the fail-safe module 110 reduces or maintains the speed control regardless of the commanded speed by inverter module to a value where motor 102 can produce maximum torque, the motor 102 may be improved over conventional motors. Additionally, the methods and system may be simple and relatively inexpensive to implement.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing the exemplary embodiment or exemplary embodiments. It should be understood that various changes can be made in the function and arrangement of elements without departing from the scope of the inventive subject matter as set forth in the appended claims and the legal equivalents thereof.

What is claimed is:

1. A method for preventing a torque overload condition of a motor electrically coupled to an inverter, the method comprising the steps of:
   calculating an estimated torque value, based, in part on an estimated speed value of a rotor of the motor, and a dc link voltage value and a dc link current value from the inverter;
   comparing the estimated torque value with a maximum available torque value;
   generating an error based on the comparison of the estimated torque value and the maximum available torque value;
   converting the error to a first value;
   limiting the first value between a negative value and zero;
   adding the first value to a speed command from the inverter; and
   generating a final speed command from the speed command from the inverter.

2. The method of claim 1, further comprising:
   generating the maximum available torque value from a predetermined table, the predetermined table comprising a range of torque values, a range of predetermined available speed values, and a range of predetermined available voltage values, the predetermined available speed values and the predetermined available voltage values each associated with a torque value of the range of torque values.

3. The method of claim 2, further comprising:
   modulating the initial voltage command using a pulse width modulator.

4. The method of claim 3, further comprising:
   producing a three-phase voltage command, based on the final speed command; and
   supplying the three-phase voltage command to the motor.

5. A system for preventing a torque overload condition of a motor electrically coupled to an inverter, the system comprising:
   a sensing means for sensing an estimated speed value of a rotor of the motor;
   a calculating means for calculating an estimated torque value, based, in part on the estimated speed value of a rotor of the motor, and a dc link voltage value and a dc link current value from the inverter;
   a generating means for generating a maximum available torque value from the estimated speed value and the dc link voltage value;
   a comparing means for comparing the estimated torque value with a maximum available torque value;
   a generating means for generating an error based on the comparison of the estimated torque value and the maximum available torque;
   a converting means for converting the error to a first value;
   a limiting means for limiting the first value between a negative value and zero;
   an adding means for adding the first value to a speed command from the inverter; and
   a generating means for generating a final speed command from the speed command from the inverter.

6. The system of claim 5, wherein:
   the generating means is capable of generating the maximum available torque value from a predetermined table, the predetermined table comprising a range of torque values, a range of predetermined available speed values, and a range of predetermined available voltage values, the predetermined available speed values and the predetermined available voltage values each associated with a torque value of the range of torque values.

7. The system of claim 5, further comprising:
   a producing means for producing an initial voltage command from the final speed command.

8. The system of claim 7, further comprising:
   a modulating means for modulating the initial voltage command.

9. The system of claim 8, further comprising:
   a producing means for producing a three-phase voltage command from the final speed command; and
   a supplying means for supplying the three-phase voltage command to the motor.

10. An oil pump system comprising:
    an oil pump;
    a motor in communication with the oil pump;
    an inverter module in electrical communication with the motor, the inverter module configured to generate a speed command; and
    a controller module in communication with the inverter module and the motor, the controller module configured to determine an error, based, in part, on an estimated torque value of the motor and a predetermined maximum available torque value, to convert the error into a first value, to limit the first value between a negative value and zero, and to add the first value to the speed command from the inverter to thereby generate a final speed command for the motor.

11. The oil pump system of claim 10, further comprising a switch disposed between the controller module and the motor, the switch configured to selectively move between an on position, if the system is in a speed control mode, and an off position, if the system is in an alignment mode or an acceleration mode.

12. The oil pump system of claim 10, wherein the controller module comprises a fail-safe module and a pulse width modulation (PWM) inverter, the fail-safe module electrically coupled between the inverter module and the motor and the PWM inverter electrically coupled between the fail-safe module and the motor.

13. The oil pump system of claim 12, wherein the fail-safe module is configured to calculate an estimated torque value, based, in part on the estimated speed value and a dc link voltage value and a dc link current value from the PWM inverter, to determine a maximum available torque value based on the estimated speed value and the dc link voltage value, to compare the estimated torque value with the maximum available torque value, and to generate the error based on the comparison of the estimated torque value and the maximum available torque value.

14. The oil pump system of claim 13, wherein the fail-safe module is configured to determine a maximum available torque value based on the estimated speed value and the dc link voltage and a predetermined table, the predetermined table comprising a range of torque values, a range of predetermined available speed values, and a range of predetermined available voltage values, the predetermined available speed values and the predetermined available voltage values each associated with a torque value of the range of torque values.

* * * * *